(12) United States Patent
Li et al.

(10) Patent No.: US 12,090,885 B2
(45) Date of Patent: Sep. 17, 2024

(54) BATTERY SWAPPING METHOD, APPARATUS, SYSTEM, DEVICE AND MEDIUM

(71) Applicant: Contemporary Amperex Technology Co., Limited, Ningde (CN)

(72) Inventors: Zhanliang Li, Ningde (CN); Zhimin Dan, Ningde (CN); Miaomiao Zhang, Ningde (CN); Yu Yan, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 304 days.

(21) Appl. No.: 17/712,088

(22) Filed: Apr. 2, 2022

(65) Prior Publication Data

US 2023/0064263 A1    Mar. 2, 2023

Related U.S. Application Data

(63) Continuation of application No. PCT/CN2021/115783, filed on Aug. 31, 2021.

(51) Int. Cl.
*B60L 53/80* (2019.01)
*B60L 53/30* (2019.01)
(Continued)

(52) U.S. Cl.
CPC ............. *B60L 53/80* (2019.02); *B60L 53/305* (2019.02); *B60L 53/60* (2019.02); *B60L 58/16* (2019.02);
(Continued)

(58) Field of Classification Search
CPC .................................. B60L 53/60; B60L 53/80
See application file for complete search history.

(56) References Cited

U.S. PATENT DOCUMENTS

| 9,302,592 B2* | 4/2016 | Lin ......................... B60L 53/80 |
| 10,055,911 B2* | 8/2018 | Luke ...................... G06F 3/0671 |

(Continued)

FOREIGN PATENT DOCUMENTS

| CN | 105809261 A | 7/2016 |
| CN | 107244312 A | 10/2017 |

(Continued)

OTHER PUBLICATIONS

The International search report for PCT Application No. PCT/CN2021/115783, dated Nov. 30, 2021, 13 pages.
(Continued)

*Primary Examiner* — Katy M Ebner
(74) *Attorney, Agent, or Firm* — East IP P.C.

(57) ABSTRACT

Battery swapping methods, apparatus, systems, devices and media are provided in the embodiments of the present disclosure. The method includes: receiving a battery swapping request of a vehicle; determining a second battery swapping time and a second swapping electricity amount based on a first battery swapping time and a first swapping electricity amount, in a case where a first charging parameter is adjusted to a second charging parameter to charge an available battery of a battery swapping station; and sending a battery swapping response to a terminal device of the vehicle, wherein the battery swapping response includes the second battery swapping time and the second swapping electricity amount, the second battery swapping time is a recommended battery swapping time provided by the battery swapping station, and the second swapping electricity amount is a recommended swapping electricity amount provided by the battery swapping station.

20 Claims, 2 Drawing Sheets

(51) Int. Cl.
  B60L 53/60 (2019.01)
  B60L 58/16 (2019.01)
  H02J 7/00 (2006.01)

(52) U.S. Cl.
  CPC ......... H02J 7/0013 (2013.01); B60L 2260/58 (2013.01)

(56) References Cited

U.S. PATENT DOCUMENTS

| | | | | |
|---|---|---|---|---|
| 10,807,493 | B1* | 10/2020 | Reeves | B60L 3/12 |
| 10,870,366 | B2* | 12/2020 | Shiiyama | B60L 53/665 |
| 11,370,313 | B2* | 6/2022 | Penilla | B60L 50/52 |
| 11,400,829 | B1* | 8/2022 | Hajimiri | B60L 53/68 |
| 11,642,978 | B2* | 5/2023 | Wu | H01M 50/249 |
| | | | | 180/68.5 |
| 2003/0209375 | A1* | 11/2003 | Suzuki | B60L 58/25 |
| | | | | 180/68.5 |
| 2009/0082957 | A1* | 3/2009 | Agassi | B60L 53/65 |
| | | | | 701/532 |
| 2015/0134467 | A1* | 5/2015 | Penilla | G06Q 50/06 |
| | | | | 705/16 |
| 2018/0260887 | A1 | 9/2018 | Takatsuka et al. | |
| 2019/0126775 | A1* | 5/2019 | Han | B60L 3/12 |
| 2019/0207398 | A1 | 7/2019 | Shih et al. | |
| 2020/0009990 | A1* | 1/2020 | Shiiyama | B60L 53/30 |
| 2020/0164760 | A1* | 5/2020 | Sohmshetty | B60L 53/53 |
| 2020/0198494 | A1* | 6/2020 | Chen | B60L 58/12 |
| 2020/0406780 | A1* | 12/2020 | Hassounah | B60L 53/53 |
| 2023/0061401 | A1* | 3/2023 | Li | H02J 7/02 |

FOREIGN PATENT DOCUMENTS

| | | |
|---|---|---|
| CN | 109978714 A | 7/2019 |
| CN | 109979103 A | 7/2019 |
| CN | 110509799 A | 11/2019 |
| CN | 111806291 A | 10/2020 |
| EP | 3363676 A1 | 8/2018 |
| JP | 2017091424 A | 5/2017 |
| JP | 2017091426 A | 5/2017 |
| JP | 2017091427 A | 5/2017 |
| JP | 2017225342 A | 12/2017 |
| JP | 2018160364 A | 10/2018 |
| JP | 2019146474 A | 8/2019 |
| KR | 20140105065 A | 9/2014 |
| WO | 2016143374 A1 | 9/2016 |
| WO | 2018153912 A1 | 8/2018 |
| WO | 2020166602 A1 | 8/2020 |

OTHER PUBLICATIONS

The First Office Action for JP Application No. 2021-560125, dated Oct. 24, 2023, 8 pages.
The Communication pursuant to Article 94(3) EPC for Europe an Application No. 21865321.0, dated Jun. 26, 2023, 8 pages.
The First Office Action for KR Application No. 10-2021-7034623, dated Aug. 23, 2023, 8 pages.
The extended European search report for European Application No. 21865321.0, dated Sep. 16, 2022, 8 pages.
Summons to attend oral proceedings pursuant to Rule 115(1) EPC for EP Application No. 21865321.0, dated Mar. 21, 2024, 11 pages.

* cited by examiner

BATTERY SWAPPING METHOD, APPARATUS, SYSTEM, DEVICE AND MEDIUM

CROSS REFERENCE TO RELATED APPLICATION

This application is a continuation of International Application No. PCT/CN2021/115783 filed on Aug. 31, 2021, the entire contents of which are incorporated herein by reference.

TECHNICAL FIELD

The present disclosure relates to the field of battery swapping, and in particular, to a battery swapping method, apparatus, system, device and medium.

BACKGROUND

With the development of electric vehicles, the battery swapping technology for vehicles has become one of development fashions of battery technology. In the battery swapping technology, a battery of a vehicle entering the battery swapping station can be removed and replaced by a battery fetched from the battery swapping station.

At the present stage, after the vehicle reaches the battery swapping station, if the battery swapping station cannot provide enough available battery packs to the user, the vehicle needs to wait for charging of the battery swapping station or find other battery swapping stations, which affects user's experience in battery swapping.

SUMMARY

Embodiments of the present disclosure provide a battery swapping method, apparatus, system, device and medium.

In a first aspect, an embodiment of the present disclosure provides a battery swapping method, comprising: receiving a battery swapping request of a vehicle that is installed with at least one battery, the battery swapping request including a first battery swapping time and a first swapping electricity amount, wherein the first battery swapping time is a scheduled battery swapping time, and the first swapping electricity amount is a scheduled swapping electricity amount; determining a second battery swapping time and a second swapping electricity amount based on the first battery swapping time and the first swapping electricity amount, in a case where a first charging parameter is adjusted to a second charging parameter to charge an available battery of a battery swapping station; and sending a battery swapping response to a terminal device of the vehicle, wherein the battery swapping response includes the second battery swapping time and the second swapping electricity amount, the second battery swapping time is a recommended battery swapping time provided by the battery swapping station, and the second swapping electricity amount is a recommended swapping electricity amount provided by the battery swapping station.

In the battery swapping method of the embodiment of the present application, after receiving the battery swapping request of the vehicle, the recommended battery swapping time and the recommended swapping electricity amount may be provided to the vehicle according to the scheduled battery swapping time and the scheduled swapping electricity amount of the battery swapping request of the vehicle in the case where the first charging parameter is adjusted to the second charging parameter. In this way, when the vehicle schedules to swap the battery, the terminal device of the vehicle can be provided with the recommended battery swapping time and the recommended swapping electricity amount based on charging ability of the battery swapping station. As such, the user can determine in advance whether swap the battery or not based on the recommended battery swapping time and the recommended swapping electricity amount, so as to avoid the case where the available batteries are insufficient when arriving the battery swapping station. Thus, the user's experience can be improved.

In an optional embodiment, the determining a second battery swapping time and a second swapping electricity amount based on the first battery swapping time and the first swapping electricity amount comprises: determining the second battery swapping time and the second swapping electricity amount, under a condition that the battery swapping station charges the available battery of the battery swapping station to the first swapping electricity amount according to the first battery swapping time by adjusting the first charging parameter to the second charging parameter, wherein the second battery swapping time is identical to the first battery swapping time, and the second swapping electricity amount is equal to the first swapping electricity amount.

With this embodiment, if the battery swapping station is charging the available battery pack with the second charging parameter, the vehicle may be recommended to replace with the battery with the first swapping electricity amount according to the first battery swapping time when the battery swapping station makes a battery with the scheduled swapping electricity amount ready at the scheduled battery swapping time.

In an optional embodiment, the determining a second battery swapping time and a second swapping electricity amount based on the first battery swapping time and the first swapping electricity amount comprises: determining the second battery swapping time and the second swapping electricity amount, under a condition that the battery swapping station charges the available battery of the battery swapping station to the second swapping electricity amount according to the first battery swapping time by adjusting the first charging parameter to the second charging parameter, wherein the second battery swapping time is identical to the first battery swapping time, and the second swapping electricity amount is less than the first swapping electricity amount.

With this embodiment, if the battery swapping station is charging the available battery pack with the second charging parameter, the vehicle may be recommended to replace with the battery with the second swapping electricity amount according to the first battery swapping time when the battery swapping station is incapable of make a battery with the scheduled swapping electricity amount ready at the scheduled battery swapping time.

In an optional embodiment, the determining a second battery swapping time and a second swapping electricity amount based on the first battery swapping time and the first swapping electricity amount comprises: determining the second battery swapping time and the second swapping electricity amount, under a condition that the battery swapping station charges the available battery of the battery swapping station to the first swapping electricity amount according to the second battery swapping time by adjusting the first charging parameter to the second charging parameter, wherein the second battery swapping time is longer than the first battery swapping time, and the second swapping electricity amount is equal to the first swapping electricity amount.

With this embodiment, if the battery swapping station is charging the available battery pack with the second charging parameter, the vehicle may be recommended to replace with the battery with the first swapping electricity amount according to the second battery swapping time when the battery swapping station is incapable of make a battery with the scheduled swapping electricity amount ready at the scheduled battery swapping time.

In an optional embodiment, the first charging rate is less than the second charging rate, the first charging parameter includes a first charging rate, and the second charging parameter includes a second charging rate, or the first charging parameter includes a first current value, and the second charging parameter includes a second current value, or the first charging parameter includes a first voltage value, and the second charging parameter includes a second voltage value.

With this embodiment, it is possible to estimate the second battery swapping time and the second swapping electricity amount according to the second charging parameter in response to the battery swapping request, so that the second battery swapping time and the second swapping electricity amount can be estimated according to the potential ability of the battery swapping station in battery swapping. As such, estimation accuracy can be improved.

In an optional embodiment, the second battery swapping time includes a standing time of the available battery and a charging time for charging the available battery of the battery swapping station based on the second charging parameter.

With this embodiment, after the battery is left to stand for a period of time, the accuracy for a collected battery performance parameter is high, so that a real performance parameter of the prepared available battery meets the needs of the vehicle.

In an optional embodiment, under a condition that the at least one battery includes a plurality of batteries, the available batteries of the battery swapping station meet at least one of following conditions according to the second battery swapping time: a difference among voltages of the available batteries is less than a preset voltage difference threshold; a difference among states of health (SOH) of the available batteries is less than a preset SOH difference threshold; a difference among temperatures of the available batteries is less than a preset temperature difference threshold.

With this embodiment, the battery swapping station can provide vehicles with batteries with better electrical performance consistency, which ensures the consistency and safety of the discharge performance of the available batteries.

In a second aspect, an embodiment of the present disclosure provides a battery swapping apparatus, comprising: a receiving module, configured to receive a battery swapping request of a vehicle that is installed with at least one battery, the battery swapping request including a first battery swapping time and a first swapping electricity amount, wherein the first battery swapping time is a scheduled battery swapping time, and the first swapping electricity amount is a scheduled swapping electricity amount; a processing module, configured to determine a second battery swapping time and a second swapping electricity amount based on the first battery swapping time and the first swapping electricity amount, in a case where a first charging parameter is adjusted to a second charging parameter to charge an available battery of a battery swapping station; and a sending module, configured to send a battery swapping response to a terminal device of the vehicle, wherein the battery swapping response includes the second battery swapping time and the second swapping electricity amount, the second battery swapping time is a recommended battery swapping time provided by the battery swapping station, and the second swapping electricity amount is a recommended swapping electricity amount provided by the battery swapping station.

With the battery swapping apparatus of the embodiment of the present application, after receiving the battery swapping request of the vehicle, the recommended battery swapping time and the recommended swapping electricity amount may be provided to the vehicle according to the scheduled battery swapping time and the scheduled swapping electricity amount of the battery swapping request of the vehicle in the case where the first charging parameter is adjusted to the second charging parameter. In this way, when the vehicle schedules to swap the battery, the terminal device of the vehicle can be provided with the recommended battery swapping time and the recommended swapping electricity amount based on charging ability of the battery swapping station. As such, the user can determine in advance whether swap the battery or not based on the recommended battery swapping time and the recommended swapping electricity amount, so as to avoid the case where the available batteries are insufficient when arriving the battery swapping station. Thus, the user's experience can be improved.

With this embodiment, if the battery swapping station is charging the available battery pack with the second charging parameter, the vehicle may be recommended to replace with the battery with the first swapping electricity amount according to the first battery swapping time when the battery swapping station makes a battery with the scheduled swapping electricity amount ready at the scheduled battery swapping time.

In an optional embodiment, to determine a second battery swapping time and a second swapping electricity amount based on the first battery swapping time and the first swapping electricity amount comprises: to determine the second battery swapping time and the second swapping electricity amount, under a condition that the battery swapping station charges the available battery of the battery swapping station to the first swapping electricity amount according to the first battery swapping time by adjusting the first charging parameter to the second charging parameter, wherein the second battery swapping time is identical to the first battery swapping time, and the second swapping electricity amount is equal to the first swapping electricity amount.

With this embodiment, if the battery swapping station is charging the available battery pack with the second charging parameter, the vehicle may be recommended to replace with the battery with the second swapping electricity amount according to the first battery swapping time when the battery swapping station is incapable of make a battery with the scheduled swapping electricity amount ready at the scheduled battery swapping time.

In an optional embodiment, to determine a second battery swapping time and a second swapping electricity amount based on the first battery swapping time and the first swapping electricity amount comprises: to determine the second battery swapping time and the second swapping electricity amount, under a condition that the battery swapping station charges the available battery of the battery swapping station to the second swapping electricity amount according to the first battery swapping time by adjusting the first charging parameter to the second charging parameter, wherein the second battery swapping time is identical to the first battery swapping time, and the second swapping electricity amount is less than the first swapping electricity amount.

In an optional embodiment, to determine a second battery swapping time and a second swapping electricity amount based on the first battery swapping time and the first swapping electricity amount comprises: to determine the second battery swapping time and the second swapping electricity amount, under a condition that the battery swapping station charges the available battery of the battery swapping station to the first swapping electricity amount according to the second battery swapping time by adjusting the first charging parameter to the second charging parameter, wherein the second battery swapping time is longer than the first battery swapping time, and the second swapping electricity amount is equal to the first swapping electricity amount.

With this embodiment, if the battery swapping station is charging the available battery pack with the second charging parameter, the vehicle may be recommended to replace with the battery with the first swapping electricity amount according to the second battery swapping time when the battery swapping station is incapable of make a battery with the scheduled swapping electricity amount ready at the scheduled battery swapping time.

In an optional embodiment, the first charging rate is less than the second charging rate, the first charging parameter includes a first charging rate, and the second charging parameter includes a second charging rate, or the first charging parameter includes a first current value, and the second charging parameter includes a second current value, or the first charging parameter includes a first voltage value, and the second charging parameter includes a second voltage value.

With this embodiment, it is possible to estimate the second battery swapping time and the second swapping electricity amount according to the second charging parameter in response to the battery swapping request, so that the second battery swapping time and the second swapping electricity amount can be estimated according to the potential ability of the battery swapping station in battery swapping. As such, estimation accuracy can be improved.

In an optional embodiment, the second battery swapping time includes a standing time of the available battery and a charging time for charging the available battery of the battery swapping station based on the second charging parameter.

With this embodiment, after the battery is left to stand for a period of time, the accuracy for a collected battery performance parameter is high, so that a real performance parameter of the prepared available battery meets the needs of the vehicle.

In an optional embodiment, under a condition that the at least one battery includes a plurality of batteries, the available batteries of the battery swapping station meet at least one of following conditions according to the second battery swapping time: a difference among voltages of the available batteries is less than a preset voltage difference threshold; a difference among states of health (SOH) of the available batteries is less than a preset SOH difference threshold; a difference among temperatures of the available batteries is less than a preset temperature difference threshold.

With this embodiment, the battery swapping station can provide vehicles with batteries with better electrical performance consistency, which ensures the consistency and safety of the discharge performance of the available batteries.

In a third aspect, there is provided a battery swapping system, comprising: a terminal device of a vehicle; and the battery swapping apparatus according to the second aspect or any one of the optional embodiments of the second aspect.

With the battery swapping system of the embodiment of the present application, after receiving the battery swapping request of the vehicle, the recommended battery swapping time and the recommended swapping electricity amount may be provided to the vehicle according to the scheduled battery swapping time and the scheduled swapping electricity amount of the battery swapping request of the vehicle in the case where the first charging parameter is adjusted to the second charging parameter. In this way, when the vehicle schedules to swap the battery, the terminal device of the vehicle can be provided with the recommended battery swapping time and the recommended swapping electricity amount based on charging ability of the battery swapping station. As such, the user can determine in advance whether swap the battery or not based on the recommended battery swapping time and the recommended swapping electricity amount, so as to avoid the case where the available batteries are insufficient when arriving the battery swapping station. Thus, the user's experience can be improved.

In a fourth aspect, there is provided a battery swapping device comprising: a processor, and a memory storing computer program instructions, wherein the processor reads and executes the computer program instructions to implement the battery swapping method according to the first aspect or any one of the optional embodiments of the first aspect.

With the battery swapping device of the embodiment of the present application, after receiving the battery swapping request of the vehicle, the recommended battery swapping time and the recommended swapping electricity amount may be provided to the vehicle according to the scheduled battery swapping time and the scheduled swapping electricity amount of the battery swapping request of the vehicle in the case where the first charging parameter is adjusted to the second charging parameter. In this way, when the vehicle schedules to swap the battery, the terminal device of the vehicle can be provided with the recommended battery swapping time and the recommended swapping electricity amount based on charging ability of the battery swapping station. As such, the user can determine in advance whether swap the battery or not based on the recommended battery swapping time and the recommended swapping electricity amount, so as to avoid the case where the available batteries are insufficient when arriving the battery swapping station. Thus, the user's experience can be improved.

In a fifth aspect, there is provided a computer storage medium storing computer program instructions thereon, which when executed by a processor, perform the battery swapping method according to the first aspect or any one of the optional embodiments of the first aspect.

With the medium of the embodiment of the present application, after receiving the battery swapping request of the vehicle, the recommended battery swapping time and the recommended swapping electricity amount may be provided to the vehicle according to the scheduled battery swapping time and the scheduled swapping electricity amount of the battery swapping request of the vehicle in the case where the first charging parameter is adjusted to the second charging parameter. In this way, when the vehicle schedules to swap the battery, the terminal device of the vehicle can be provided with the recommended battery swapping time and the recommended swapping electricity amount based on charging ability of the battery swapping station. As such, the user can determine in advance whether swap the battery or not based on the recommended battery swapping time and the recommended swapping electricity amount, so as to avoid the case where the available batteries are insufficient when arriving the battery swapping station. Thus, the user's experience can be improved.

BRIEF DESCRIPTION OF THE DRAWINGS

In order to more clearly illustrate technical solutions of the embodiments of the present disclosure, drawings used in the embodiments of the present disclosure will be briefly described below. Obviously, the attached drawings described below are only some embodiments of this application. For those skilled in the art, other drawings may be obtained from these figures without any creative work.

In the drawings, the drawings are not drawn according to actual scale.

DETAILED DESCRIPTION

The orientation words appearing in the following description are all related to directions shown in the figures, and do not limit the specific structure of the application. In the description of this application, it should also be noted that, unless otherwise clearly defined and limited, the terms "installation", "concatenation", and "connection" should be understood in a broad sense. For example, it may be a fixed connection, a removable connection, or an integral connection; or it may be directly connected or indirectly connected through an intermediate medium. For those of ordinary skill in the art, the specific meanings of the above terms in this application can be understood according to specific circumstances.

Features and exemplary embodiments in various aspects of the present disclosure will be described in detail. The present disclosure will be further described in detail below with reference to the accompanying drawings and specific embodiments, to make the purposes, the technical solutions, and the advantages clearer. It is understood that the specific embodiments described herein are only intended as illustrative and not limiting. The present disclosure may be practiced without some of the details of these specific details, as would be understood by the skilled in the art. The following description of the embodiments is merely intended to provide a better understanding of the disclosure by illustration of examples of the present disclosure.

It should be noted that, in this context, relationship terms such as first and second are used merely to distinguish one entity or operation from another entity or operation, and do not necessarily require or imply that there is any such an actual relationship or order between such entities or operations. Furthermore, the term "comprise" or "include" or any other variations thereof is intended to encompass a non-exclusive inclusion, such that a process, method, article, or device that comprises a plurality of elements includes not only those elements but also other elements that are not listed exactly, or elements that are inherent to such a process, method, article, or device. An element that is defined by the phrase "comprising", without limiting the disclosure, does not exclude the presence of additional elements in the process, method, article, or device.

With the rapid development of new energy technologies, various technologies serving new energy have also been greatly improved. Considering difficulty of charging, slow charging rate, and limited battery life, the battery swapping technology for new energy vehicles emerged.

The battery swapping technology adopts a "separation of vehicle and battery" approach, which may provide a battery replacement service for the vehicle through a battery swapping station. That is, the battery can be quickly removed from or installed in the vehicle.

However, at the present stage, after the vehicle reaches the battery swapping station, the battery swapping station will determine whether there are sufficient available batteries. If the battery swapping station cannot provide enough available battery packs to the user, the vehicle needs to wait for charging of the battery swapping station or find other battery swapping stations, which affects user's experience in battery swapping. Exemplarily, in a specific application scenario where the battery swapping station is incapable of meet the battery swapping demand of the vehicle, it is possible that the vehicle cannot find that there is no available battery in the battery swapping station until the vehicle arrives at the battery swapping station, and then needs to look for other battery swapping stations, or the vehicle may find that there is a need to wait for a long time period after arriving at the battery swapping station, which affects the user's experience.

Therefore, there is a need for a technical solution that can improve user's experience.

Based on above, the embodiments of the present application provide a battery swapping method, apparatus, device, and medium, which may be applied to an application scenario where a vehicle swaps a battery in a battery swapping station. Exemplarily, it can be specifically applied to a specific application scenario where a vehicle is scheduled for battery swapping. Compared with the above related technology, the recommended battery swapping time and the recommended swapping electricity amount may be provided to the user according to the scheduled battery swapping time and the scheduled swapping electricity amount in response to the battery swapping request of the vehicle. In this way, the user can determine in advance whether swap the battery or not based on the recommended battery swapping time and the recommended swapping electricity amount, so as to avoid the case where the available batteries are insufficient when arriving the battery swapping station. As such, the user's experience can be improved.

In order to better understand this application, before introducing the battery swapping solutions provided by the embodiments of this application, the embodiments of this application first provide specific explanations on the concepts of vehicle, battery, and battery swapping station involved in this application in turn.

(1) Vehicle. The vehicle in the embodiments of the present application may be detachably connected to the battery. In some embodiments, the vehicle may be one that uses a power battery as a power source, for example a car, a truck, or the like.

(2) Battery. The battery in the embodiments of the present application may be a lithium ion battery, a lithium metal battery, a lead-acid battery, a nickel barrier battery, a nickel hydrogen battery, a lithium sulfur battery, a lithium air battery, or a sodium ion battery, etc, which is not limited herein.

In terms of scale, the battery may be a battery cell, or a battery module or a battery pack, which is not limited herein.

In terms of application, the battery may be used in an electric vehicle to supply power to a motor of the electric vehicle as the power source for the electric vehicle. The battery may also provide power for other electrical devices of the electric vehicle, such as an air conditioner in the car, a car player, and so on.

(3) Battery swapping station. In the embodiments of the present application, the battery swapping station may refer to a place that provides a battery swapping service for vehicles. For example, it may be a fixed place, or a mobile place such as a mobile vehicle for battery swapping, which is not limited in the embodiments of the present application.

After introducing the above concepts, for ease of understanding, before specific description of the battery swapping schemes provided in the embodiments of the present application, the following parts of the embodiments of the present application will first illustrate an exemplary battery swapping scenario.

Figure 1:
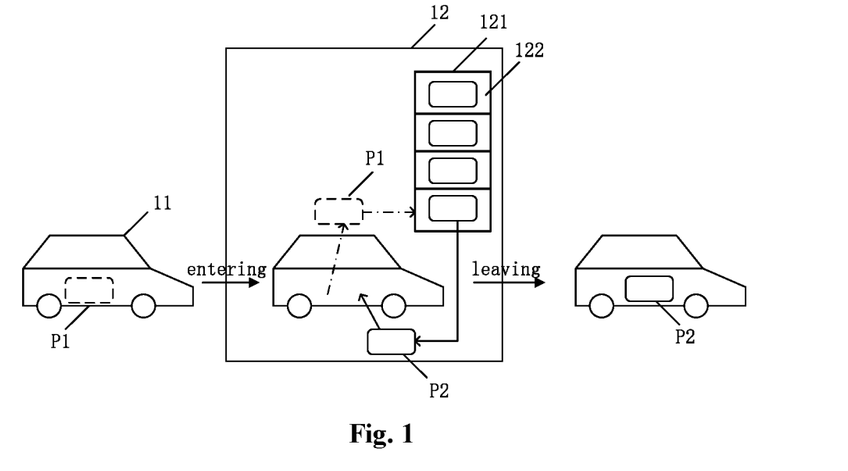
FIG. 1 is a schematic scenario diagram of an exemplary battery swapping scenario provided by an embodiment of the present application.

FIG. 1 is a schematic scenario diagram of an exemplary battery swapping scenario provided by an embodiment of the present application. As shown in FIG. 1, a battery swapping station 12 may include a battery swapping cabinet 121. The battery swapping cabinet 121 may include multiple charging bins 122.

After a vehicle 11 equipped with a battery P1 enters the battery swapping station 12, the battery swapping station 12 removes the first battery P1 from the vehicle 11 through a battery swapping apparatus, takes out a second battery P2 from a charging bin 122, and install the second battery P2 in the vehicle 11. Then the vehicle 11 installed with the power battery P2 may be driven away from the battery swapping station 12. With this battery swapping technology, the vehicle can be quickly replenished with energy within a few minutes or even tens of seconds, which improves the user's experience.

In addition, for the removed battery P1, it may be placed in an empty charging bin 122 for charging, so that the battery swapping station 12 may continue to provide battery swapping service for other vehicles.

After introducing the battery swapping scenario, next, for ease of understanding, before specific description of the battery swapping schemes provided in the embodiments of the present application, the following parts of the embodiments of the present application will first illustrate a battery swapping system.

Figure 2:
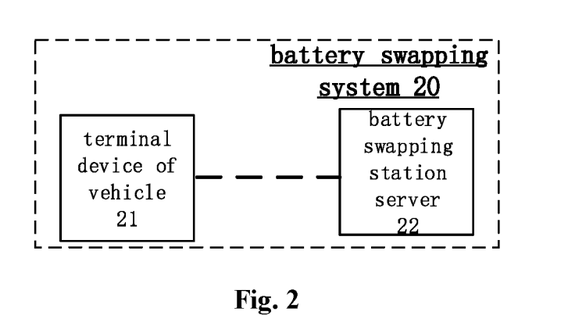
FIG. 2 is a system frame diagram of a battery swapping system provided by an embodiment of the present application.

FIG. 2 is a system frame diagram of a battery swapping system provided by an embodiment of the present application. As shown in FIG. 2, a battery swapping system 10 may include a terminal device 21 of a vehicle and a battery swapping station server 22.

First, for the terminal device 21 of the vehicle, it may include a device or module with an external communication function. For example, the terminal device 21 of the vehicle may be a device with communication functions such as a mobile phone, a smart watch, a computer, a tablet computer, a vehicle-mounted communication device, and the like.

In some examples, the terminal device 21 of the vehicle may include a vehicle networking device such as a telematics BOX (TBOX) or RDB (a vehicle networking device). For example, the user may initiate a battery swapping request through a mobile phone APP, and then send the request to the battery swapping station server 22 via the vehicle networking device. For another example, the user initiates a battery swapping request on an information input device such as a control screen of the vehicle. For example, the user clicks on a "Battery Swapping" control on the touch screen, and the information input device sends the battery swapping request to the battery swapping station server 22 through the vehicle networking device.

Secondly, for the battery swapping station server 22, it may include a communication function and a calculation function.

Thirdly, the terminal device 21 of the vehicle and the battery swapping station server 22 may communicate with each other via the Internet. For example, they may communicate using the Global System for Mobile Communications (GSM) network, the 4th generation mobile communication technology (4G) and other data transmission networks, as well as Bluetooth, Zigbee and other short-range wireless communication technologies, which is not limited herein.

Figure 3:
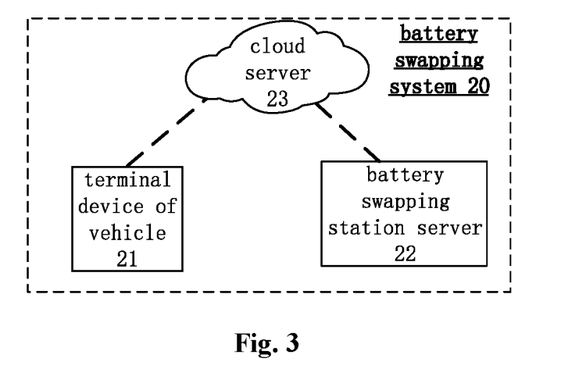
FIG. 3 is a system frame diagram of another battery swapping system provided by an embodiment of the present application.

FIG. 3 is a system frame diagram of another battery swapping system provided by an embodiment of the present application. The difference between FIG. 3 and FIG. 2 is that the battery swapping system 20 may also include a cloud server 23, and the terminal device 21 of the vehicle and the cloud server 23 may communicate with each other, and the cloud server 23 and the battery swapping station server 22 may communicate with each other. The above devices may communicate through the above data transmission network, which will not be repeated here.

The cloud server 23 may be a physical server or a virtual server, which is not specifically limited in the embodiments of the present application.

In some embodiments, the terminal device 21 of the vehicle may also communicate with the battery swapping station server 22. Specific communication methods may be found in the above content of the embodiments of the present application, which will not be repeated here.

After fully introducing the battery swapping system, next, the following parts of the embodiments of the present application will detail the battery swapping methods, apparatus, devices, and media according to the embodiments of the present application in conjunction with the accompanying drawings. It should be noted that these embodiments are not used to limit the scope of the disclosure.

Figure 4:
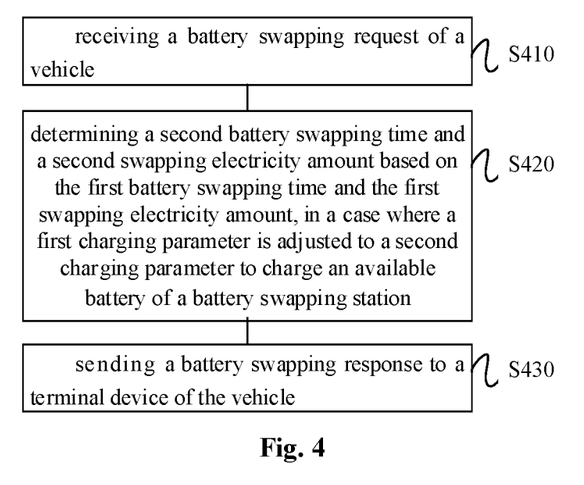
FIG. 4 is a schematic flow chart of a first battery swapping method provided by an embodiment of the present application.

FIG. 4 is a schematic flow chart of a first battery swapping method provided by an embodiment of the present application. Execution body of each step in FIG. 4 may be a battery swapping apparatus with computing capability, such as a battery swapping station server or a cloud server, which is not specifically limited.

As shown in FIG. 4, the battery swapping method includes S410 to S430.

At S410, a battery swapping request of the vehicle is received.

First of all, for the vehicle, the vehicle in the embodiments of the present application may be equipped with at least one battery pack. Other contents related to the vehicle in the embodiments of the present application may refer to the relevant description of the above embodiments of the present application, which will not be repeated here.

Secondly, for the battery swapping request, from the perspective of a request sender, in some embodiments, the battery swapping request may be initiated by the user on the touch screen of the vehicle networking device or by the user via an application (APP) or a webpage for scheduling battery swapping of a mobile terminal device such as a mobile phone. In other embodiments, the battery swapping request may be sent by the battery swapping station server after the vehicle arrives at the battery swapping station.

From the perspective of specific meaning of the battery swapping request. The battery swapping request in the embodiments of the present application indicates that the vehicle requests to change the battery at the battery swapping station. Specifically, the battery swapping request in the embodiments of the present application includes a first battery swapping time and a first swapping electricity amount. The first battery swapping time is a scheduled battery swapping time, and the first swapping electricity amount is a scheduled swapping electricity amount. Correspondingly, the battery swapping request including the first battery swapping time and the first swapping electricity amount indicates that the vehicle requests to replace with one or more batteries with the first swapping electricity amount according to the first battery swapping time. Correspondingly, in an example, the battery swapping request may include the first battery swapping time of 16:40 and the first swapping electricity amount of 80%, that is, the battery swapping request indicates that the vehicle requests to replace with the battery with 80% SOC at 16:40.

Next, specific description will be given for the first swapping electricity amount and the first battery swapping time.

First, for specific meaning of the two items, description is provided below.

Regarding the first battery swapping time T1, it may be a scheduled battery swapping time. The first battery swapping time T1 may be a designated target battery swapping time, that is, the user wants to perform the battery swapping at the battery swapping time. Or, it may be the latest time for battery swapping that the user can accept. Or it may be the earliest time for the user to reach the battery swapping station. The specific meaning of the first battery swapping time T1 is not limited in this application.

In an example, the form of the first battery swapping time may include a specific battery swapping time instance, for example, in the form of "hour:minute:second". Or, it may also include a specific year, month, and day, and its form is not specifically limited. In another example, the first battery swapping time may indicate a corresponding period of time in which the vehicle requests a battery swapping. For example, if the first battery swapping time is indicated as 50 minutes (min), it means that the vehicle requests a battery swapping in 50 minutes. It may be indicated as a corresponding period of time in which battery swapping is requested since the vehicle initiates the battery swapping request, or it may be indicated as a corresponding period of time in which battery swapping is requested since a response time instance for the battery swapping request. The specific form of the first battery swapping time T1 in the embodiments of the present application may be set according to actual scenarios and specific requirements, which is not limited herein.

In other embodiments, for the first swapping electricity amount C1, it may be a scheduled swapping electricity amount. That is, it means the electricity amount that the vehicle needs to be provided by the battery swapping station. The first swapping electricity amount C1 may be a designated target swapping electricity amount, that is, the user wants to replace with a battery with this electricity amount. Or, it may be the minimum battery electricity amount that the user can accept. Or it may be the maximum battery electricity amount that the user accepts. Specific meaning of the first swapping electricity amount C1 is not limited in this application. Exemplarily, the first swapping electricity amount C1 may be a parameter representing the battery electricity, such as state of charge (SOC) of the battery or electricity quantity Q of the battery.

Secondly, for specific acquisition methods of the two items, description is provided below.

In some embodiments, the first battery swapping time T1 and the first swapping electricity amount C1 may be inputted by the user on an information input module, such as the touch screen of the vehicle networking device or an application (APP) or a webpage for scheduling battery swapping of a mobile terminal device such as a mobile phone. In a specific example, the user may choose whether to input the first swapping electricity amount C1. When the first swapping electricity amount C1 inputted by the user is received, it is determined that the user chooses to replace with the battery with the target electricity amount by default. The target electricity amount may be a preset value such as 100% SOC or 90% SOC, which may be set according to specific scenarios and actual needs, and will not be repeated here.

In other embodiments, the first battery swapping time T1 may be calculated.

In an example, a specific calculation method of the first battery swapping time T1 includes:

Step A1, obtaining driving data of the vehicle after receiving the user's related operation of triggering the scheduled battery swapping on the above information input module. The driving data includes location information of the vehicle when the related operation of the scheduled battery swapping is triggered and driving habit information of the user. The driving habit information of the user may include information such as a driving speed of the user within a period of time and/or a braking frequency of the user.

Step A2: calculating the first battery swapping time according to the location information of the user, the location information of the battery swapping station, and the driving habit information.

Exemplarily, an average driving speed V may be calculated according to the driving speed of the user within a period of time, and a distance S between the vehicle and the battery swapping station may be calculated according to the location information of the user and the location information of the battery swapping station. The first battery swapping time T1 is calculated according to the distance S and the average driving speed V. For example, a ratio Ta of the distance S to the average driving speed V may be used as the first battery swapping time T1; or a sum of the ratio Ta and the time when the vehicle triggers the scheduled battery swapping operation may be used as the first battery swapping time T1. For another example, the braking number N of the user is calculated according to the braking frequency of the user and the ratio Ta, and a sum of the ratio Ta and a product Tb of an average braking duration and N is used as the first battery swapping time T1; or a sum of the ratio Ta, the time when the vehicle triggers the scheduled battery swapping operation, and the product Tb of the average braking duration and N is used as the first battery swapping time T1.

In some embodiments, when the number of batteries installed in the vehicle is more than one, the battery swapping request may also include the number of batteries. For example, if one or more batteries in the vehicle fail, the number of batteries inputted by the user via the above information input device may be received. For another example, the number of batteries corresponding to the vehicle may be determined according to model information of the vehicle. For example, model A corresponds to 2 batteries and model B corresponds to 3 batteries. After receiving the model information of a vehicle with the model A, it may be determined that 2 battery packs need to be replaced. For another example, if the user does not input, the battery number is a preset number by default. For example, it may be the number of battery often set in vehicles such as 2 or 3, and the preset number may be set according to actual scenes and specific needs, which will not be repeated here.

It should be noted that when M batteries are installed in the vehicle and the batteries need to be replaced at the same time, the battery swapping request may not include the number of batteries. After the battery swapping apparatus receives the battery swapping request, it will determine that M batteries are needed. M is an integer greater than or equal to 2.

At S420, a second battery swapping time and a second swapping electricity amount is determined based on the first battery swapping time and the first swapping electricity amount, in a case where a first charging parameter is adjusted to a second charging parameter to charge the available battery of the battery swapping station.

Firstly, for the battery swapping station, in some embodiments, it may be a target battery swapping station selected by the user of the vehicle. For example, it may be the target battery swapping station selected by the user from a plurality of optional battery swapping stations on the above information input device. For another example, it may be a battery swapping station where the vehicle arrives. In other embodiments, the battery swapping station may be a plurality of battery swapping stations capable of providing battery swapping. For example, if the battery swapping method is performed by a cloud server, and the battery swapping request includes information about remaining battery capacity of the vehicle, then the cloud server may determine, based on the remaining battery capacity after receiving the battery swapping request of the vehicle, remaining mileage of the vehicle, and determine multiple battery swapping stations within a preset range centered at the vehicle position corresponding to the battery swapping information with the remaining mileage as a radius, and then executes S420 for the multiple battery swapping stations.

It should be noted that other content of the battery swapping station may be found in the relevant content of the above parts of this application, which will not be repeated here.

Secondly, for the available battery(s), it may mean a battery that can replace one in a vehicle in the embodiments of the application. The available battery may be a battery with electricity amount reaching the second swapping electricity amount according to the second battery swapping time when the battery swapping station charges it with the second charging parameter. In some embodiments, if the number P of batteries that reach the second swapping electricity amount at the second exchange time in the battery swapping station is greater than the number M of batteries required by the user, then M batteries selected from the P batteries are used as available batteries.

In some embodiments, it is also required that a battery temperature of the available battery is within a preset temperature range. The preset temperature range may be a temperature range suitable for operation of the battery. When the temperature of the battery is within the preset temperature range, the battery may have good charging and discharging performance, safety and stability. In some embodiments, the preset temperature range may be a temperature range for normal operation of the battery. For example, the preset temperature range may be (+10° C., +∞). In an optional embodiment, the preset temperature range may be (+20° C., +55° C.).

Exemplarily, if the total amount of batteries in the battery swapping station that reach the second swapping electricity amount according to the second battery swapping time is greater than or equal to the number M of batteries that need to be replaced in the vehicle, but the number of batteries in the battery swapping station with a temperature within the preset temperature range is less than M, temperature modulation can be performed on some of the batteries with a temperature outside the preset temperature range, so that the battery swapping station can provide M available batteries with electricity amount equal to the second swapping electricity amount according to the second battery swapping time and the temperature within the preset temperature range.

Specifically, for the battery with a temperature higher than the upper limit temperature value of the preset temperature range, a heat dissipation module can be used to dissipate heat of the battery. The heat dissipation module may be for example a semiconductor heat sink, a heat dissipation pipeline, etc., which is not limited.

And, for the battery with a temperature lower than the lower limit temperature value of the preset temperature range, the battery may be heated in a battery self-heating mode, with an ambient temperature, or by a heating module.

In other embodiments, if the vehicle needs M batteries, the M batteries also need to meet a preset grouping condition, where the preset grouping condition may include at least one of the following sub-conditions A-C.

Sub-condition A: A difference among voltages of the available batteries is less than a preset voltage difference threshold. In an example, the preset voltage difference threshold may be determined according to the maximum allowable sampling error value $\Delta V$ of the battery cells in the battery and the number L of battery cells in a single available battery. For example, the preset voltage difference threshold may be $\Delta V \times L$. For example, the maximum allowable sampling error value $\Delta V$ may be 0.48 volts (V). It should be noted that the preset voltage difference threshold may be set in different ways or with different values according to actual scenarios and specific needs. For example, a specific value may be 2V, and the setting method and specific value are not limited.

By setting the sub-condition A, it is possible to prevent the risk of burning the relay on the battery power supply line due to the excessive voltage difference among the available batteries, thus the safety and reliability of the batteries are improved. In addition, it is possible to prevent the circulating current among the available batteries from consuming the battery power due to the voltage difference among the available batteries, thus the battery power consumption speed is reduced.

Sub-condition B: A difference among electricity parameters of the available batteries is less than a preset electricity difference threshold. The battery parameter may be a parameter that can measure the capacity of the battery, for example, it may be the electricity amount of the battery, or the SOC of the battery, which is not limited. In addition, the preset electricity difference threshold may be set according to actual scenarios and specific needs. For example where the electricity parameter is SOC, the preset electricity difference threshold may be 3% or 5%. The setting method and specific value is not limited.

In some embodiments, when service life of the batteries differs greatly, the SOC of the batteries with the same voltage may be different. When the M batteries meet the above sub-condition A and the sub-condition B at the same time, consistency of charging and discharging characteristics of the batteries can be ensured, thus additional power loss and safety risk caused by inconsistent difference of battery life of the batteries during usage can be avoided.

Sub-condition C: A difference among states of health (SOH) of the available batteries is less than a preset SOH difference threshold.

SOH represents the aging degree of a battery. The smaller the SOH, the higher the aging degree of the battery. For example, SOH=100% means that the battery is before delivery or leaving the factory, that is, the aging degree of the battery is at the Beginning of Life (BOL). SOH=0% means that the battery is in a scrapped state. In a specific example, the SOH of the battery at the target time may be represented by a ratio of the full charge capacity of the battery at the target time to the rated capacity. In another specific example, the SOH of the battery at the target time may be represented by a ratio of the number of remaining cycles of the battery at the target time to the total number of cycles of the battery. It should be noted that SOH may also be expressed in other ways, such as the maximum discharge capacity and internal resistance, which is not specifically limited in the embodiments of the present application.

The preset SOH difference threshold may be set according to actual scenarios and specific requirements. The setting method and specific value are not limited.

Since the difference in the health degree of the batteries will cause difference in the charge and discharge performance during usage of the batteries, the sub-condition C can ensure the consistency of the charge and discharge characteristics of the batteries, thus additional power loss and safety risk caused by inconsistent difference of battery life of the batteries during usage can be avoided.

Sub-condition D: A difference among temperatures of the available batteries is less than a preset temperature difference threshold.

In some embodiments, the preset temperature difference threshold may be set according to actual scenarios and specific requirements, for example, its specific value may be 3 degrees Celsius (° C.), and its setting method and specific value are not limited.

Through sub-condition D, by adjusting the temperature, it is possible to ensure that the charge and discharge performance of each battery pack is in a better state.

In some embodiments, if the number of available batteries P within the battery swapping station that meet the above preset grouping conditions and can be charged to reach the second swapping electricity amount according to the second battery swapping time with the second charging parameter, is greater than the number M of batteries as required by the user, M available batteries may be selected from the P available batteries according to the following sub-conditions in addition to the above sub-conditions.

Sub-condition E: Among the P available batteries, the M batteries that first enter the battery swapping station are selected to be matched into a group. Through the sub-condition E, it is possible to prevent the batteries from being idle in the battery swapping station, and the use frequency of each battery can be balanced. In this way, the balance of battery life can be ensured on the whole.

Sub-condition F: if there are multiple groups of available battery packs in the battery swapping station, and the batteries in each group of available battery packs meet the above preset grouping conditions with each other, the battery(s) of a group of available battery packs with the highest swapping electricity amount can be selected as the available battery(s).

In terms of quantity, the number of available batteries provided for the vehicle in the embodiments of the present application may be the same as the maximum number of batteries that can be installed on the vehicle, that is, all the batteries on the vehicle can be replaced with available batteries. Or, the number of available batteries that can be provided to the vehicle is less than the maximum number of batteries that can be installed in the vehicle, that is, a part of the batteries in the vehicle can be replaced with the available batteries. The number of available batteries is not specifically limited.

It should be noted that if a part of the batteries in the vehicle are replaced with the available batteries, the available batteries according to the second battery swapping time and the remaining batteries in the vehicle according to the second battery swapping time need meet the above preset grouping conditions.

After fully explaining the available batteries, charging parameters will be detailed next.

For the first charging parameter and the second charging parameter, the first charging parameter and the second charging parameter may be parameters related to a battery charging rate. The charging rate corresponding to the second charging parameter is greater than the charging rate corresponding to the first charging parameter.

In an example, the first charging parameter may be a first charging rate, and the second charging parameter may be a second charging rate. The first charging rate is less than the second charging rate.

In another example, the first charging parameter may be a first current value, and the second charging parameter may be a second current value. The first current value is smaller than the second current value.

In yet another example, the first charging parameter may be a first voltage value, and the second charging parameter may be a second voltage value. The first voltage value is less than the second voltage value.

In this embodiment, the battery swapping station may charge the batteries with the first charging parameter, so as to minimize battery aging and prolong battery life. The battery swapping station may also charge the batteries with the second charging parameter to improve the charging efficiency. In this embodiment, the second battery swapping time and the second swapping electricity amount may be estimated according to the second charging parameter in response to the battery swapping request, which improves the estimation accuracy, so that the second battery swapping time and the second swapping electricity amount can be estimated according to the potential ability of the battery swapping station in battery swapping. In turn, the ability of the battery swapping station in battery swapping can be further improved.

After introducing the charging rate, next, multiple embodiments will be described for the second battery swapping time and the second swapping electricity amount of S420 in combination with the charging ability of the battery swapping station.

First, the second battery swapping time is the recommended battery swapping time provided by the battery swapping station, and the second swapping electricity amount is the recommended swapping electricity amount provided by the battery swapping station. The second swapping electricity amount may be the estimated electricity amount of the available battery according to the second battery swapping time when the available battery is charged by the battery swapping station with the second charging parameter.

In some embodiments, in order to improve the sampling accuracy of the battery performance parameters, the second battery swapping time includes a standing time of the available battery and a charging time for charging the available battery of the battery swapping station based on the second charging parameter. The standing time may be set according to actual scenarios and specific requirements, such as 10 minutes, etc., which is not specifically limited.

With this embodiment, after the battery is left to stand for a period of time, the accuracy for a collected battery performance parameter is high, so that a real performance parameter of the prepared available battery meets the needs of the vehicle.

Next, in the embodiments of the present application, the second battery swapping time and the second swapping electricity amount will be described in detail in conjunction with the charging ability of the battery swapping station.

In some embodiments, in the case where the battery swapping station charges the available battery of the battery swapping station with the second charging parameter, if the available battery reaches the first swapping electricity amount according to the first battery swapping time, the second battery swapping time is identical to the first battery swapping time, and the second swapping electricity amount is equal to the first swapping electricity amount. That is, if the battery swapping station is capable of charging to the scheduled swapping electricity amount at the scheduled battery swapping time, the vehicle is recommended to replace with the available battery with the first swapping electricity amount according to the first battery swapping time. For example where the battery swapping station charge the available battery in the battery swapping station with the second charging parameter, if the available battery reaches the first swapping electricity amount at time tx, and if the time tx is less than or equal to the first battery swapping time T1, it means that the available battery can reach the first swapping electricity amount according to the first battery swapping time.

In some other embodiments, in the case where the battery swapping station charges the available battery of the battery swapping station with the second charging parameter, if the available battery reaches the second swapping electricity amount which is less than the first swapping electricity amount according to the first battery swapping time, the second battery swapping time is identical to the first battery swapping time. That is, if the battery swapping station is incapable of prepare the scheduled swapping electricity amount of the vehicle at the scheduled battery swapping time, the vehicle may be recommended to replace with the available battery with the second swapping electricity amount according to the first battery swapping time.

In still some other embodiments, in the case where the battery swapping station charges the available battery of the battery swapping station with the second charging parameter, if the available battery reaches the first swapping electricity amount according to the second battery swapping time, the second battery swapping time is longer than the first battery swapping time, and the second swapping electricity amount is equal to the first swapping electricity amount. That is, if the battery swapping station is incapable of prepare the scheduled swapping electricity amount of the vehicle at the scheduled battery swapping time, the vehicle may be recommended to replace with the available battery with the first swapping electricity amount according to the second battery swapping time.

At S430, a battery swapping response is sent to the terminal device of the vehicle.

At S430, the battery swapping response includes the second battery swapping time and the second swapping electricity amount.

In some embodiments, in order to improve flexibility of battery swapping, the battery swapping response may also include other battery swapping time and other swapping electricity amount corresponding to the other battery swapping time in addition to the second battery swapping time T2 and the second swapping electricity amount C2. For example, the battery swapping response includes: the second battery swapping time T2 and the recommended swapping electricity amount according to the second battery swapping time T2, and a third battery swapping time T3 and a recommended swapping electricity amount at the third battery swapping time T3.

Exemplarily, in the case where the available battery is charged by the battery swapping station with the second charging parameter, the electricity amount of the available battery according to the second battery swapping time is equal to the first swapping electricity amount, and the second battery swapping time is greater than the first battery swapping time That is, when the battery swapping station performs charging with the second charging parameter, it cannot provide the user with the scheduled swapping electricity amount at the user's scheduled battery swapping time. Then the battery swapping response may also include the first battery swapping time and the swapping electricity amount of the available battery according to the first battery swapping time when the battery is charged by the battery swapping station with the second charging parameter. For example, the vehicle is scheduled to replace with the battery with 95% SOC at 15:00, but the battery swapping station can charge the battery to have 75% SOC at 15:00 with the second charging parameter, and can charge the battery to have 95% SOC at 15:30 with the second charging parameter. Then the battery swapping response may include: the second battery swapping time 15:00, the second swapping electricity amount 95%; and the third battery swapping time 15:00, the third swapping electricity amount 75%, so that the vehicle can choose an appropriate battery swapping time and an appropriate swapping electricity amount therefrom.

In other embodiments, in order to provide the vehicle with a more flexible battery swapping strategy, the battery swapping response may also include a swapping electricity amount at fourth battery swapping time recommended by the battery swapping station when the battery swapping station charges the available battery with the first charging parameter. For example, the swapping electricity amount according to the first battery swapping time when the battery swapping station charges the available battery with the first charging parameter, and when the available battery reaches the first swapping electricity amount at the fourth battery swapping time if the battery swapping station charges the available battery with the first charging parameter, the battery swapping response may further include the fourth battery swapping time and a fourth swapping electricity amount, the fourth swapping electricity amount being equal to the first swapping electricity amount.

In the battery swapping methods of the embodiments of the present application, after receiving the battery swapping request of the vehicle, the recommended battery swapping time and the recommended swapping electricity amount may be provided to the vehicle according to the scheduled battery swapping time and the scheduled swapping electricity amount of the battery swapping request of the vehicle in the case where the first charging parameter is adjusted to the second charging parameter. In this way, when the vehicle schedules to swap the battery, the terminal device of the vehicle can be provided with the recommended battery swapping time and the recommended swapping electricity amount based on charging ability of the battery swapping station. As such, the user can determine in advance whether swap the battery or not based on the recommended battery swapping time and the recommended swapping electricity amount. Thus, the user's experience can be improved.

In some embodiments, if battery swapping confirmation information from the terminal device of the vehicle is received, the battery swapping station may be controlled to prepare the available battery.

For specific preparation methods, the embodiments of the present application are specifically described below.

In an example, if the electricity amount of the available battery is the first swapping electricity amount, that is, if the available battery is already prepared when the vehicle schedules a battery, the available battery may stand until the vehicle arrives to replace with it.

In another example, if the available battery may reaches the first swapping electricity amount according to the first battery swapping time when it is charged with the first charging parameter, the available battery can be charged with the first charging parameter.

With this embodiment, the battery life can be prolonged when the available battery is charged with the first charging parameter, thus in this case, selecting the first charging parameter to charge the available battery can ensure that the battery life is improved while battery swapping station provides the vehicle with a specified swapping electricity amount at a specified time.

It should be noted that in this case, if charging positions of the battery swapping station are insufficient, for example, the number of batteries scheduled by multiple vehicles is greater than the number of charging bins of the battery swapping station, in order to improve the overall charging process, the second charging parameter can be used to charge the available battery.

In another example, the swapping electricity amount according to the first battery swapping time is less than the first swapping electricity amount if the available battery is charged with the first charging parameter, and the swapping electricity amount according to the first battery swapping time is greater than the first swapping electricity amount if the available battery is charged with the second charging parameter.

In order to ensure charging quality, the second charging parameter may be used to charge the battery first, and after a preset voltage value or a preset time is reached, the second charging parameter may be adjusted to the first charging parameter for charging the battery.

In still another example, the battery swapping station charges the available battery with the second charging parameter, the swapping electricity amount according to the second battery swapping time is equal to the first swapping electricity amount, and the second battery swapping time is greater than the first battery swapping time. That is, when the battery swapping station charges at a high rate (the second charging parameter), the battery swapping station cannot prepare the scheduled swapping electricity amount at the scheduled battery swapping time of the vehicle. In this case, the battery swapping station may be controlled to charge at the second charging rate until the first swapping electricity amount is reached.

After fully introducing the charging modulation strategy of the battery swapping station through the above multiple examples, next, a binding relationship between the available battery and the vehicle will be described in detail in some embodiments.

In some embodiments, in order to ensure reliability of the battery swapping process, after receiving the battery swapping confirmation information from the terminal device of the vehicle, a binding relationship between the vehicle and the available battery may be established.

With this embodiment, it is possible to reserve an available battery for the vehicle after receiving the battery swapping request of the vehicle, which can avoid the situations such as finding that the battery is replaced by other vehicles after the vehicle arrives at the battery swapping station, improve the reliability of the battery swapping process, and improve the user's experience in battery swapping.

After fully introducing the first battery swapping method provided by the embodiments of the present application in conjunction with FIG. 4 and the above embodiments, based on the same inventive concept, embodiments of the present application also provide a second battery swapping method. The second battery swapping method includes the following steps B1 to B3.

At step B1, a battery swapping request of a vehicle is received. The battery swapping request includes a first battery swapping time. The first battery swapping time is a scheduled battery swapping time.

At step B2, an estimated swapping electricity amount of a battery swapping station according to the first battery swapping time is determined in a case where a first charging parameter is adjusted to a second charging parameter to charge an available battery of the battery swapping station.

At step B3: a battery swapping response is sent to a terminal device of the vehicle. The battery swapping response includes the first battery swapping time and the estimated swapping electricity amount.

In some embodiments, in order to improve the flexibility of the battery swapping strategy, the battery swapping response may include estimated swapping electricity amounts according to the first battery swapping time corresponding to a plurality of charging parameters. The estimated swapping electricity amount corresponding to each charging parameter according to the first battery swapping time includes an estimated value of the swapping electricity amount that the available battery can reach according to the first battery swapping time when the available battery is charged by the battery swapping station with the charging parameter.

It should be noted that other content of the second battery swapping method is similar to the content of the above first battery swapping method, which will not be repeated here.

The difference from the above first battery swapping method is that the above first battery swapping method may provide a negotiable battery swapping mode between the vehicle and the battery swapping station, but the second battery swapping method provides a battery swapping mode mainly based on the ability of the battery swapping station in battery swapping.

In addition, based on the same inventive concept, the embodiments of the present application also provide a third battery swapping method. The third battery swapping method includes the following steps C1 to C3.

At step C1, a battery swapping request of a vehicle is received. The battery swapping request includes a first swapping electricity amount. The first swapping electricity amount is a scheduled swapping electricity amount.

At step C2, in a case where a first charging parameter is adjusted to a second charging parameter to charge an available battery of a battery swapping station, an estimated charging completion time at which electricity amount of the available battery reaches the first swapping electricity amount is determined.

In an example, in order to reduce collection error of the battery electricity amount, the estimated charging completion time includes standing time after the available battery reaches the first swapping electricity amount.

At step C3, a battery swapping response is sent to a terminal device of the vehicle. The battery swapping response includes the first swapping electricity amount and the estimated charging completion time.

In some embodiments, in order to improve the flexibility of the battery swapping strategy, the battery swapping response may include the estimated charging completion time corresponding to the first swapping electricity amount when the available battery is charged with multiple charging parameters.

The third battery swapping method differs from the above two battery swapping methods in that it provides a battery swapping mode mainly based on the user's battery swapping requirements.

Based on the same concept, in addition to providing battery swapping methods, the embodiments of the present application also provide corresponding battery swapping apparatus.

A battery swapping apparatus is detailed below in conjunction with the accompanying figures according to embodiments of the present application.

Figure 5:
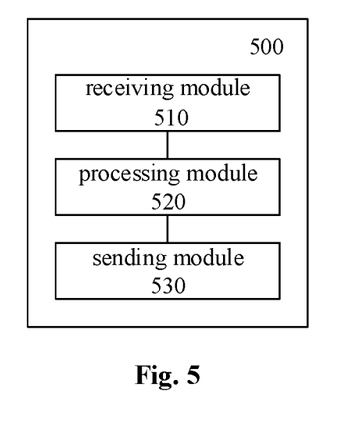
FIG. 5 is a schematic structural diagram of a battery swapping apparatus provided by an embodiment of the present application.

FIG. 5 is a schematic structural diagram of a battery swapping apparatus provided by an embodiment of the present application. As shown in FIG. 5, the battery swapping apparatus 500 includes:
- a receiving module 510, configured to receive a battery swapping request of a vehicle, wherein the vehicle is installed with at least one battery, the battery swapping request includes a first battery swapping time and a first swapping electricity amount, the first battery swapping time is a scheduled battery swapping time, and the first swapping electricity amount is a scheduled swapping electricity amount;
- a processing module 520, configured to determine a second battery swapping time and a second swapping electricity amount based on the first battery swapping time and the first swapping electricity amount, in a case where a first charging parameter is adjusted to a second charging parameter to charge an available battery of a battery swapping station;
- a sending module 530, configured to send a battery swapping response to a terminal device of the vehicle, wherein the battery swapping response includes the second battery swapping time and the second swapping electricity amount, the second battery swapping time is a recommended battery swapping time provided by the battery swapping station, and the second swapping electricity amount is a recommended swapping electricity amount provided by the battery swapping station.

In some embodiments, the processing module 520 is configured to: determine the second battery swapping time and the second swapping electricity amount, if the available battery of the battery swapping station is charged to the first swapping electricity amount according to the first battery swapping time when the battery swapping station adjusts the first charging parameter to the second charging parameter. The second battery swapping time is identical to the first battery swapping time, and the second swapping electricity amount is equal to the first swapping electricity amount.

In some embodiments, the processing module 520 is configured to: determine the second battery swapping time and the second swapping electricity amount, if the available battery of the battery swapping station is charged to the second swapping electricity amount according to the first battery swapping time when the battery swapping station adjusts the first charging parameter to the second charging parameter. The second battery swapping time is identical to the first battery swapping time, and the second swapping electricity amount is less than the first swapping electricity amount.

In some embodiments, the processing module 520 is configured to: determine the second battery swapping time and the second swapping electricity amount, if the available battery of the battery swapping station is charged to the first swapping electricity amount according to the second battery swapping time when the battery swapping station adjusts the first charging parameter to the second charging parameter. The second battery swapping time is longer than the first battery swapping time, and the second swapping electricity amount is equal to the first swapping electricity amount.

In some embodiments, a first charging rate is less than a second charging rate, the first charging parameter includes the first charging rate, and the second charging parameter includes the second charging rate, or the first charging parameter includes a first current value, and the second charging parameter includes a second current value, or the first charging parameter includes a first voltage value, and the second charging parameter includes a second voltage value.

In some embodiments, the second battery swapping time includes a standing time of the available battery and a charging time for charging the available battery of the battery swapping station based on the second charging parameter.

In some embodiments, if the at least one battery includes a plurality of batteries, the available batteries of the battery swapping station meet at least one of following conditions according to the second battery swapping time: a difference among voltages of the available batteries is less than a preset voltage difference threshold; a difference among states of health (SOH) of the available batteries is less than a preset SOH difference threshold; a difference among temperatures of the available batteries is less than a preset temperature difference threshold.

With the battery swapping apparatus of the embodiments of the present application, after receiving the battery swapping request of the vehicle, the recommended battery swapping time and the recommended swapping electricity amount may be provided to the vehicle according to the scheduled battery swapping time and the scheduled swapping electricity amount of the battery swapping request of the vehicle in the case where the first charging parameter is adjusted to the second charging parameter. In this way, when the vehicle schedules to swap the battery, the terminal device of the vehicle can be provided with the recommended battery swapping time and the recommended swapping electricity amount based on charging ability of the battery swapping station. As such, the user can determine in advance whether swap the battery or not based on the recommended battery swapping time and the recommended swapping electricity amount. Thus, the user's experience can be improved.

Other details of the battery swapping apparatus according to the embodiments of the present application are similar to the battery swapping methods described above in conjunction with the examples shown in FIG. 4, and corresponding technical effects can be achieved, which will not be repeated here for conciseness.

Based on the same application concept, in addition to battery swapping method and battery swapping apparatus, the embodiments of the present application also provide a corresponding battery swapping system.

The battery swapping system includes: a terminal device of a vehicle and a battery swapping apparatus.

In some embodiments, the battery swapping apparatus may be a battery swapping station server or a cloud server, which is not specifically limited.

The battery swapping system of the embodiments of the present application may be as shown in FIG. 2 and FIG. 3, which will not be repeated here.

With the battery swapping system of the embodiments of the present application, after receiving the battery swapping request of the vehicle, the recommended battery swapping time and the recommended swapping electricity amount may be provided to the vehicle according to the scheduled battery swapping time and the scheduled swapping electricity amount of the battery swapping request of the vehicle in the case where the first charging parameter is adjusted to the second charging parameter. In this way, when the vehicle schedules to swap the battery, the terminal device of the vehicle can be provided with the recommended battery swapping time and the recommended swapping electricity amount based on charging ability of the battery swapping station. As such, the user can determine in advance whether swap the battery or not based on the recommended battery swapping time and the recommended swapping electricity amount. Thus, the user's experience can be improved.

Other details of the battery swapping apparatus according to the embodiments of the present application are similar to the battery swapping system, method and apparatus described above in conjunction with the examples shown in FIGS. 2-5, and corresponding technical effects can be achieved, which will not be repeated here for conciseness.

Figure 6:
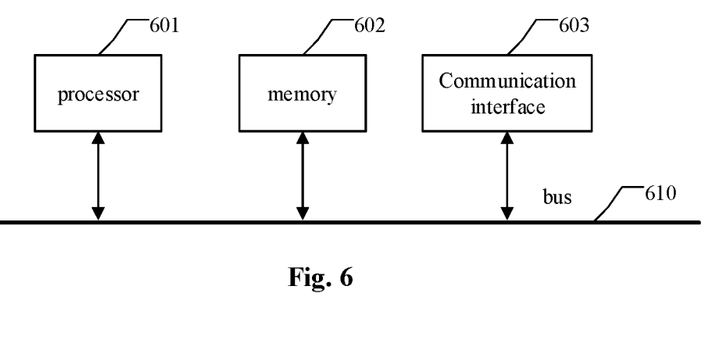
FIG. 6 shows a schematic diagram of hardware structure of a battery swapping device provided by an embodiment of the present application.

FIG. 6 shows a schematic diagram of hardware structure of a battery swapping device provided by an embodiment of the present application.

The battery swapping device may include a processor 601 and a memory 602 storing computer program instructions.

Specifically, the above processor 601 may include a Central Processing Unit (CPU), or an Application Specific Integrated Circuit (ASIC), or may be configured to be one or more integrated circuits implementing the embodiments of the present application.

The memory 602 may include a large-capacity memory for data or instructions. For example rather limitation, the memory 602 may include a Hard Disk Drive (HDD), a floppy disk drive, a flash memory, an optical disk, a magneto-optical disk, a magnetic tape, or a Universal Serial Bus (USB) drive, or a combination of two or more thereof. In some examples, the memory 602 may include removable or non-removable (or fixed) media, or the memory 602 is anon-volatile solid-state memory. In some embodiments, the memory 602 may be inside or outside of the battery swapping device.

In some examples, the memory 602 may be a Read Only Memory (ROM). In an example, the ROM may be a mask-programmed ROM, a programmable ROM (PROM), an erasable PROM (EPROM), an electrically erasable PROM (EEPROM), an electrically erasable ROM (EAROM), or flash memory or a combination of two or more thereof.

The memory 602 may include a read-only memory (ROM), a random access memory (RAM), a magnetic disk storage media device, an optical storage media device, a flash memory device, an electrical, optical, or other physical/tangible memory storage device. Therefore, generally, the memory includes one or more tangible (non-transitory) computer-readable storage media (e.g., memory devices) encoded with software including computer-executable instructions, and when the software is executed (e.g., by one or more processors), it is operable to perform the operations described with reference to the methods according to an aspect of the present disclosure.

The processor 601 implements the methods/steps S410 to S430 in the embodiments shown in FIG. 3 by reading and executing the computer program instructions stored in the memory 602 and achieves the corresponding technical effects when implementing the methods/steps S410 to S430 in the embodiments shown in FIG. 3, which will not be repeated for conciseness.

In an example, the battery swapping device may further include a communication interface 603 and a bus 610. As shown in FIG. 6, the processor 601, the memory 602, and the communication interface 603 are connected and complete mutual communication through the bus 610.

The communication interface 603 is mainly used to implement communication between various modules, means, units and/or devices in the embodiments of the present application.

The bus 610 includes hardware, software, or both, and couples components of online data flow accounting device to each other. For example rather limitation, the bus may include Accelerated Graphics Port (AGP) or other graphics bus, Extended Industry Standard Architecture (EISA) bus, Front Side Bus (FSB), Hyper Transport (HT) interconnection, Industry Standard Architecture (ISA) bus, unlimited bandwidth interconnection, Low Pin Count (LPC) bus, memory bus, microchannel architecture (MCA) bus, Peripheral Component Interconnection (PCI) bus, PCI-Express (PCI-X) bus, Serial Advanced Technology Attachment (SATA) bus, Video Electronics Standards Association Local (VLB) bus or other suitable bus, or a combination of two or more thereof. Appropriately, the bus 610 may include one or more buses. Although the embodiments of the present application describe and show a specific bus, any suitable bus or interconnection is contemplated in the present application.

The battery swapping device may execute the battery swapping methods in the embodiments of the present application, so as to realize the battery swapping method and apparatus described in conjunction with FIG. 3 and FIG. 4.

In addition, in combination with the battery swapping methods in the above embodiments, the embodiments of the present application may provide a computer storage medium for implementation. The computer storage medium stores computer program instructions which, when executed by the processor, implement any of the battery swapping methods in the above embodiments.

It should be clear that the present application is not limited to the specific configuration and process described above and shown in the drawings. For the sake of brevity, a detailed description of known method is omitted here. In the above embodiments, several specific steps are described and shown as examples. However, the method process of the present application is not limited to the specific steps described and shown, and those skilled in the art may make various changes, modifications and additions, or change the order between the steps after understanding the spirit of the present application.

The function modules in the above structural diagrams may be implemented as hardware, software, firmware, or a combination thereof. When implemented in hardware, it may be, for example, an electronic circuit, an application specific integrated circuit (ASIC), appropriate firmware, a plug-in device, a function card, and the like. When implemented in software, the elements of the present disclosure may be program(s) or code segment(s) that is configured to perform the required tasks. The program(s) or code segment(s) may be stored in a machine-readable medium, or transmitted on a transmission medium or a communication link through a data signal carried on a carrier wave. A "machine-readable medium" may include any medium capable of storing or transmitting information. Examples of machine-readable media include electronic circuits, semiconductor memory devices, ROM, flash memory, erasable ROM (EROM), floppy disks, CD-ROMs, optical disks, hard disks, optical fiber media, radio frequency (RF) links, etc. Code segments may be downloaded via a computer network such as the Internet, an intranet, and the like.

It should also be noted that the exemplary embodiments mentioned in the present application describe some methods or systems based on a series of steps or devices. However, the present application is not limited to the order of the above steps, that is, the steps may be performed in the order mentioned in the embodiments, or may be performed in a different order from that of the embodiments, or several steps may be performed at the same time.

Various aspects of the present disclosure have been described above with reference to the flowcharts and/or block diagrams of the methods, apparatuses, devices, and computer program products according to the embodiments of the present disclosure. It should be understood that each block in the flowcharts and/or block diagrams and combinations of blocks in the flowcharts and/or block diagrams can be implemented by computer program instructions. These computer program instructions can be provided to a processor of a general-purpose computer, a special-purpose computer, or other programmable data processing device to produce a machine, so that the execution of these instructions via the processor of the computer or other programmable data processing device enables implementation of the functions/actions specified in one or more blocks of the flowcharts and/or block diagrams. Such a processor can be, but is not limited to, a general-purpose processor, a dedicated processor, a special application processor, or a field programmable logic circuit. It can also be understood that each block in the block diagrams and/or flowcharts and the combination of the blocks of the block diagrams and/or flowcharts can also be implemented by dedicated hardware that performs the specified function or action, or can be implemented by a combination of dedicated hardware and computer instructions.

The above descriptions are only specific implementations of the present application. Those skilled in the art can clearly understand that for convenience and conciseness of description, the specific operation process of the above-described systems, modules and units may refer to the corresponding process in the forgoing method embodiments, which will not be repeated here. It should be understood that the protection scope of the present application is not limited to the embodiments, and any person skilled in the art can easily conceive various equivalent modifications or substitutions within the technical scope disclosed in the present application, and these modifications or substitutions should be within the protection scope of the present application.

What is claimed is:

1. A battery swapping method, comprising:
receiving a battery swapping request of a vehicle that is installed with at least one battery, the battery swapping request including a first battery swapping time and a first swapping electricity amount, wherein the first battery swapping time is a scheduled battery swapping time, and the first swapping electricity amount is a scheduled swapping electricity amount;
determining a second battery swapping time and a second swapping electricity amount based on the first battery swapping time and the first swapping electricity amount, in a case where a first charging parameter is adjusted to a second charging parameter to charge an available battery of a battery swapping station;
sending a battery swapping response to a terminal device of the vehicle, wherein the battery swapping response includes the second battery swapping time and the second swapping electricity amount, the second battery swapping time is a recommended battery swapping time provided by the battery swapping station, and the second swapping electricity amount is a recommended swapping electricity amount provided by the battery swapping station; and
under a condition that the battery swapping request includes a plurality of batteries, determining if a plurality of available batteries of the battery swapping station meets at least one of following conditions at the second battery swapping time:
a difference among voltages of the plurality of available batteries is less than a preset voltage difference threshold;
a difference among electricity parameters of the plurality of available batteries is less than a preset electricity difference threshold;
a difference among states of health (SOH) of the plurality of available batteries is less than a preset SOH difference threshold;
a difference among temperatures of the plurality of available batteries is less than a preset temperature difference threshold.

2. The method according to claim 1, wherein the determining a second battery swapping time and a second swapping electricity amount based on the first battery swapping time and the first swapping electricity amount comprises:
  determining the second battery swapping time and the second swapping electricity amount, under a condition that the battery swapping station charges the available battery of the battery swapping station to the first swapping electricity amount according to the first battery swapping time by adjusting the first charging parameter to the second charging parameter,
  wherein the second battery swapping time is identical to the first battery swapping time, and the second swapping electricity amount is equal to the first swapping electricity amount.

3. The method according to claim 1, wherein the determining a second battery swapping time and a second swapping electricity amount based on the first battery swapping time and the first swapping electricity amount comprises:
  determining the second battery swapping time and the second swapping electricity amount, under a condition that the battery swapping station charges the available battery of the battery swapping station to the second swapping electricity amount according to the first battery swapping time by adjusting the first charging parameter to the second charging parameter,
  wherein the second battery swapping time is identical to the first battery swapping time, and the second swapping electricity amount is less than the first swapping electricity amount.

4. The method according to claim 1, wherein the determining a second battery swapping time and a second swapping electricity amount based on the first battery swapping time and the first swapping electricity amount comprises:
  determining the second battery swapping time and the second swapping electricity amount, under a condition that the battery swapping station charges the available battery of the battery swapping station to the first swapping electricity amount according to the second battery swapping time by adjusting the first charging parameter to the second charging parameter,
  wherein the second battery swapping time is longer than the first battery swapping time, and the second swapping electricity amount is equal to the first swapping electricity amount.

5. The method according to claim 1, wherein the first charging parameter is less than the second charging parameter,
  the first charging parameter includes a first charging rate, and the second charging parameter includes a second charging rate, or
  the first charging parameter includes a first current value, and the second charging rate includes a second current value, or
  the first charging parameter includes a first voltage value, and the second charging rate includes a second voltage value.

6. The method according to claim 2, wherein
  the second battery swapping time includes a standing time of the available battery and a charging time for charging the available battery of the battery swapping station based on the second charging parameter.

7. A battery swapping apparatus, comprising:
  a receiving module, configured to receive a battery swapping request of a vehicle that is installed with at least one battery, the battery swapping request including a first battery swapping time and a first swapping electricity amount, wherein the first battery swapping time is a scheduled battery swapping time, and the first swapping electricity amount is a scheduled swapping electricity amount;
  a processing module, configured to determine a second battery swapping time and a second swapping electricity amount based on the first battery swapping time and the first swapping electricity amount, in a case where a first charging parameter is adjusted to a second charging parameter to charge an available battery of a battery swapping station; and
  a sending module, configured to send a battery swapping response to a terminal device of the vehicle, wherein the battery swapping response includes the second battery swapping time and the second swapping electricity amount, the second battery swapping time is a recommended battery swapping time provided by the battery swapping station, and the second swapping electricity amount is a recommended swapping electricity amount provided by the battery swapping station,
  wherein the processing module is further configured to:
    under a condition that the battery swapping request includes a plurality of batteries, determine if a plurality of available batteries of the battery swapping station meets at least one of following conditions at the second battery swapping time:
    a difference among voltages of the plurality of available batteries is less than a preset voltage difference threshold;
    a difference among states of health (SOH) of the plurality of available batteries is less than a preset SOH difference threshold;
    a difference among temperatures of the plurality of available batteries is less than a preset temperature difference threshold.

8. The apparatus according to claim 7, wherein to determine a second battery swapping time and a second swapping electricity amount based on the first battery swapping time and the first swapping electricity amount comprises:
  determining the second battery swapping time and the second swapping electricity amount, under a condition that the battery swapping station charges the available battery of the battery swapping station to the first swapping electricity amount according to the first battery swapping time by adjusting the first charging parameter to the second charging parameter,
  wherein the second battery swapping time is identical to the first battery swapping time, and the second swapping electricity amount is equal to the first swapping electricity amount.

9. The apparatus according to claim 7, wherein to determine a second battery swapping time and a second swapping electricity amount based on the first battery swapping time and the first swapping electricity amount comprises:
  determining the second battery swapping time and the second swapping electricity amount, under a condition that the battery swapping station charges the available battery of the battery swapping station to the second swapping electricity amount according to the first battery swapping time by adjusting the first charging parameter to the second charging parameter,
  wherein the second battery swapping time is identical to the first battery swapping time, and the second swapping electricity amount is less than the first swapping electricity amount.

10. The apparatus according to claim 7, wherein to determine a second battery swapping time and a second swapping electricity amount based on the first battery swapping time and the first swapping electricity amount comprises:

determining the second battery swapping time and the second swapping electricity amount, under a condition that the battery swapping station charges the available battery of the battery swapping station to the first swapping electricity amount according to the second battery swapping time by adjusting the first charging parameter to the second charging parameter, wherein the second battery swapping time is longer than the first battery swapping time, and the second swapping electricity amount is equal to the first swapping electricity amount.

11. The apparatus according to claim 7, wherein the first charging parameter is less than the second charging parameter, the first charging parameter includes a first charging rate, and the second charging parameter includes a second charging rate, or the first charging parameter includes a first current value, and the second charging rate includes a second current value, or the first charging parameter includes a first voltage value, and the second charging rate includes a second voltage value.

12. The apparatus according to claim 7, wherein the second battery swapping time includes a standing time of the available battery and a charging time for charging the available battery of the battery swapping station based on the second charging parameter.

13. A battery swapping system, comprising:
a terminal device of a vehicle; and
the battery swapping apparatus according to claim 7.

14. A battery swapping system, comprising:
a terminal device of a vehicle; and
the battery swapping apparatus according to claim 8.

15. A battery swapping system, comprising:
a terminal device of a vehicle; and
the battery swapping apparatus according to claim 9.

16. A battery swapping system, comprising:
a terminal device of a vehicle; and
the battery swapping apparatus according to claim 10.

17. A battery swapping system, comprising:
a terminal device of a vehicle; and
the battery swapping apparatus according to claim 11.

18. A battery swapping system, comprising:
a terminal device of a vehicle; and
the battery swapping apparatus according to claim 12.

19. A battery swapping device comprising: a processor, and a memory storing computer program instructions, wherein the processor reads and executes the computer program instructions to implement the battery swapping method according to claim 1.

20. A computer storage medium storing computer program instructions thereon, which when executed by a processor, implement the battery swapping method according to claim 1.

* * * * *